(12) United States Patent
Chih et al.

(10) Patent No.: US 8,056,870 B2
(45) Date of Patent: Nov. 15, 2011

(54) DISPLAY AND REGULATING DEVICE THEREOF

(75) Inventors: Ting-Hui Chih, Hualien (TW); Li-De He, Taipei (TW)

(73) Assignee: Qisda Corporation, Taoyuan County (TW)

( * ) Notice: Subject to any disclaimer, the term of this patent is extended or adjusted under 35 U.S.C. 154(b) by 1141 days.

(21) Appl. No.: 11/830,711

(22) Filed: Jul. 30, 2007

(65) Prior Publication Data

US 2008/0036716 A1     Feb. 14, 2008

(30) Foreign Application Priority Data

Aug. 11, 2006   (TW) ............................... 95129547 A (51) Int. Cl.
*F16M 11/00* (2006.01)
(52) U.S. Cl. ...... 248/157; 248/423; 248/917; 248/354.5
(58) Field of Classification Search .................. 248/157, 248/354.5, 423; 345/87
See application file for complete search history.

(56) References Cited

U.S. PATENT DOCUMENTS

| | | | | | |
|---|---|---|---|---|---|
| 3,179,071 | A | * | 4/1965 | Johnston | 108/147.2 |
| 3,642,320 | A | * | 2/1972 | Ward | 297/344.18 |
| 5,011,174 | A | * | 4/1991 | Ross-Clunis | 280/287 |
| 5,598,788 | A | * | 2/1997 | Jonker | 108/147 |
| 5,751,548 | A | * | 5/1998 | Hall et al. | 361/679.41 |
| 6,138,973 | A | * | 10/2000 | Woodward | 248/423 |

\* cited by examiner

*Primary Examiner* — Terrell McKinnon
*Assistant Examiner* — Daniel J. Breslin (57) ABSTRACT

A display including a base, a panel and a regulating device is disclosed. The regulating device disposed between the base and the panel comprises a first element and a second element. The first element comprises a first positioning region. The second element connected to the panel and disposed on the first element to be movably switched between a first position and a second position, comprises a second positioning region detachably disposed in the first positioning region of the first element. When the second element is positioned in the first position, the second positioning region of the second element is positioned in the first positioning region of the first element; when the second element is moved to the second position from the first position, the second positioning region of the second element is positioned in the first positioning region of the first element, wherein a distance is formed between the first and second positions.

12 Claims, 11 Drawing Sheets

DISPLAY AND REGULATING DEVICE THEREOF

BACKGROUND OF THE INVENTION

1. Field of the Invention

The invention relates to a display, and in more particularly to an adjustable display, the height of which is changed by a regulating device.

2. Description of the Related Art

A liquid crystal display (LCD) typically comprises a panel and a seat for supporting the panel. A rail or an engaging slot, connected to a spring, is disposed in the seat for adjusting the panel to a desired height.

When the panel is adjusted, however, an additional locking mechanism such as a screw or bolt must be used to secure the rail or engaging slot, thus, height adjustment operations may be inconvenient.

BRIEF SUMMARY OF THE INVENTION

Adjustable height displays are provided. An exemplary embodiment of an adjustable height display comprises a base, a panel and a regulating device. The regulating device disposed between the base and the panel comprises a first element and a second element. The first element comprises a first positioning region. The second element connected to the panel and disposed on the first element to be movably switched between a first position and a second position, comprises a second positioning region detachably disposed in the first positioning region of the first element. When the second element is positioned in the first position, the second positioning region of the second element is positioned in the first positioning region of the first element. When the second element is moved to the second position from the first position, the second positioning region of the second element is positioned in the first positioning region of the first element, thus, the first and second positions are spaced apart by a distance.

The second element moves the panel between the first and second positions. The distance is a height difference.

The display further comprises a third element used to guide the second element. The third element comprises a third positioning region used to position the second element. The third positioning region is a slotted structure.

The second element further comprises a handle guided by the third positioning region to detachably move the second positioning region of the second element to the first positioning region of the first element.

The second element further comprises a handle to detachably move the second positioning region of the second element to the first positioning region of the first element. The first positioning region of the first element comprises at least two recesses for positioning the second positioning region of the second element. The second positioning region of the second element comprises at least one positioning part for positioning the first positioning region of the first element.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
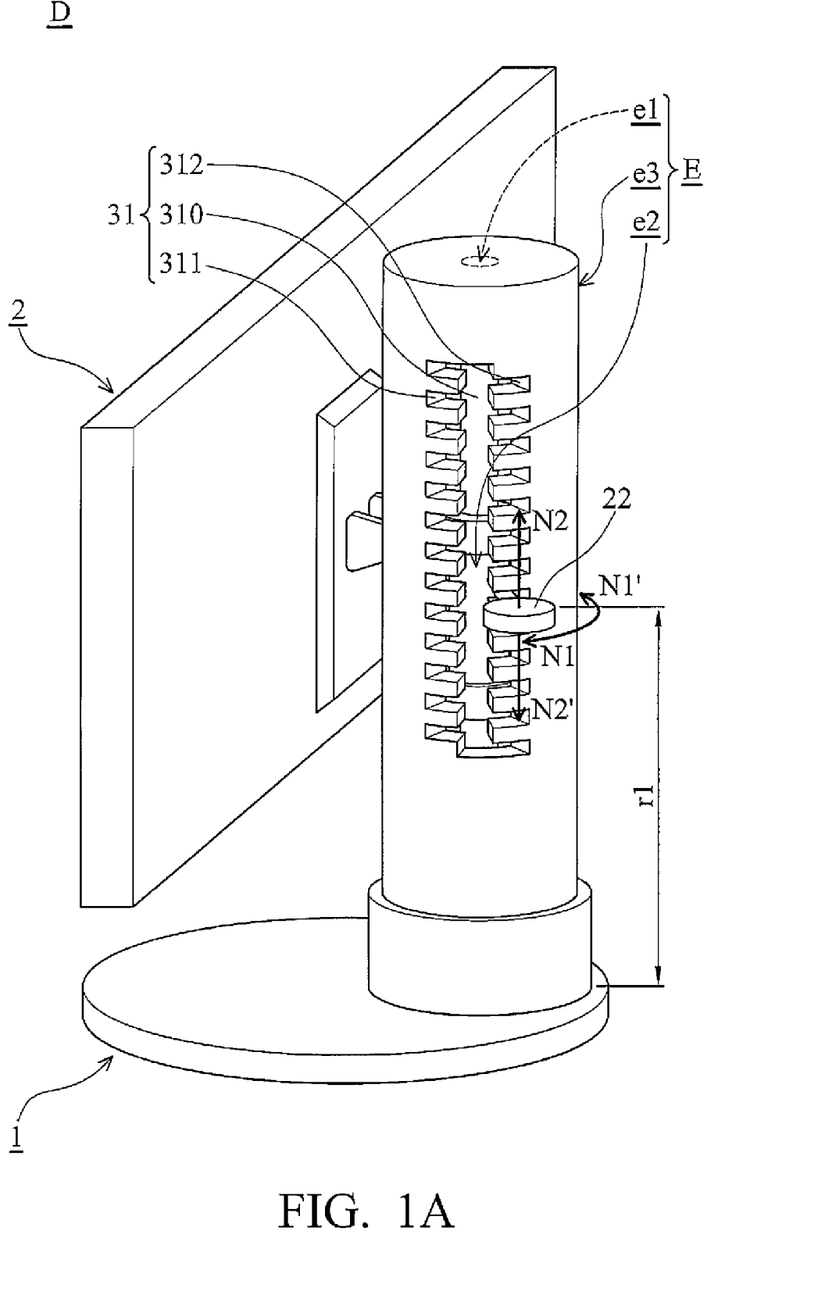
FIG. 1A is a schematic view of a display of the invention located in a first position, wherein the display comprises a base, a panel and a regulating device.
Figure 1B:
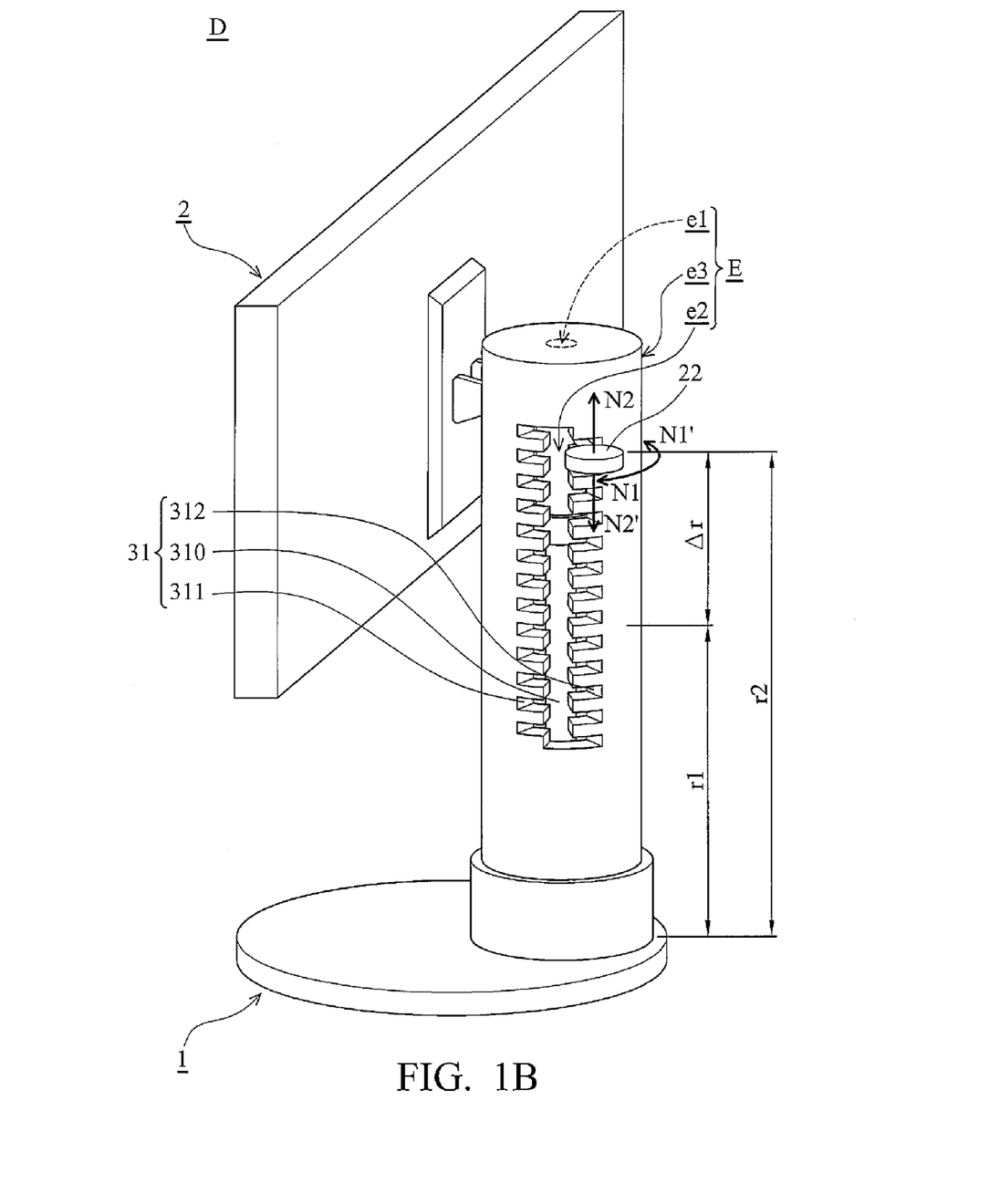
FIG. 1B is a schematic view of a display of the invention located in a second position.
Figure 1C:
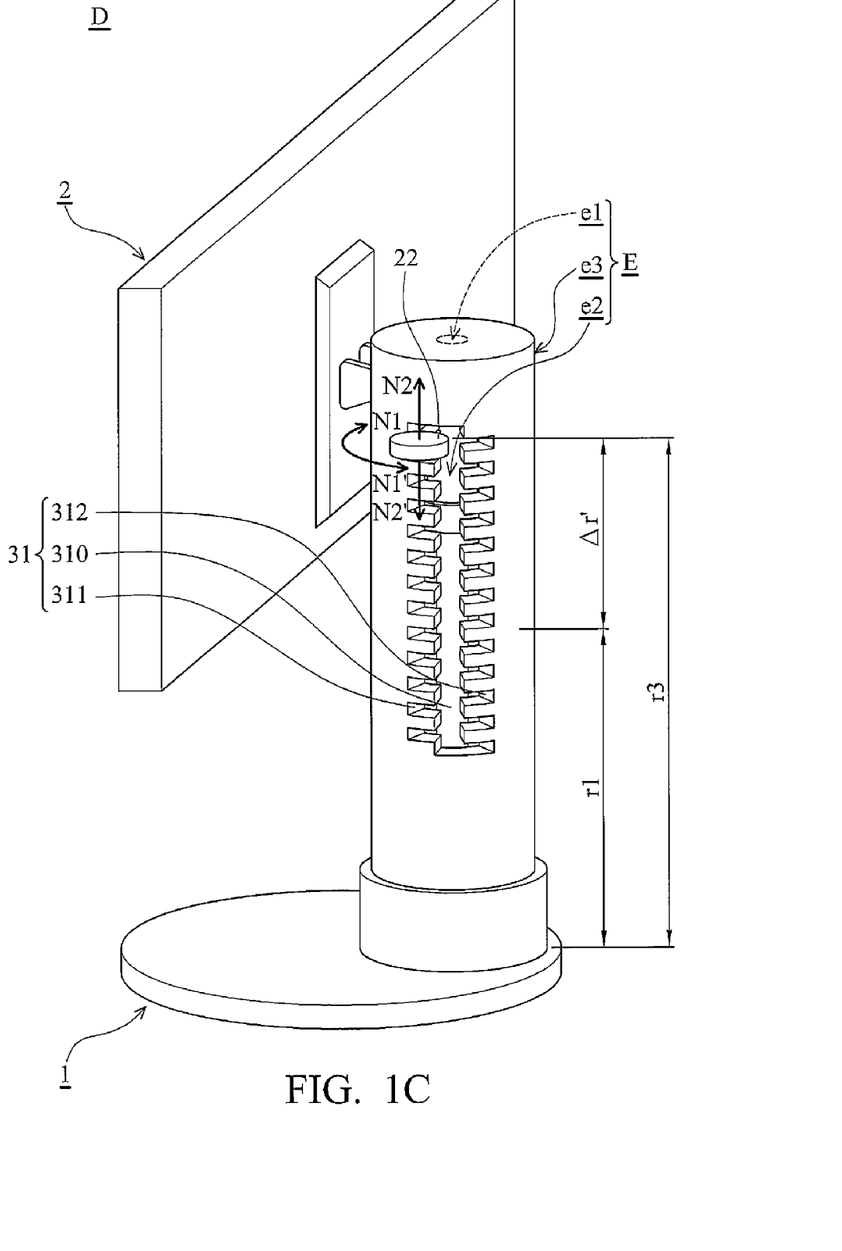
FIG. 1C is a schematic view of a display of the invention located in a third position.

In FIGS. 1A, 1B and 1C, a display D of the invention is located in first, second and third positions, respectively. The display D comprises a base 1, a panel 2, and a regulating device E disposed between the base 1 and the panel 2. The panel 2 is capable of switching between two distinct positions r1 and r2.

Figure 2A:
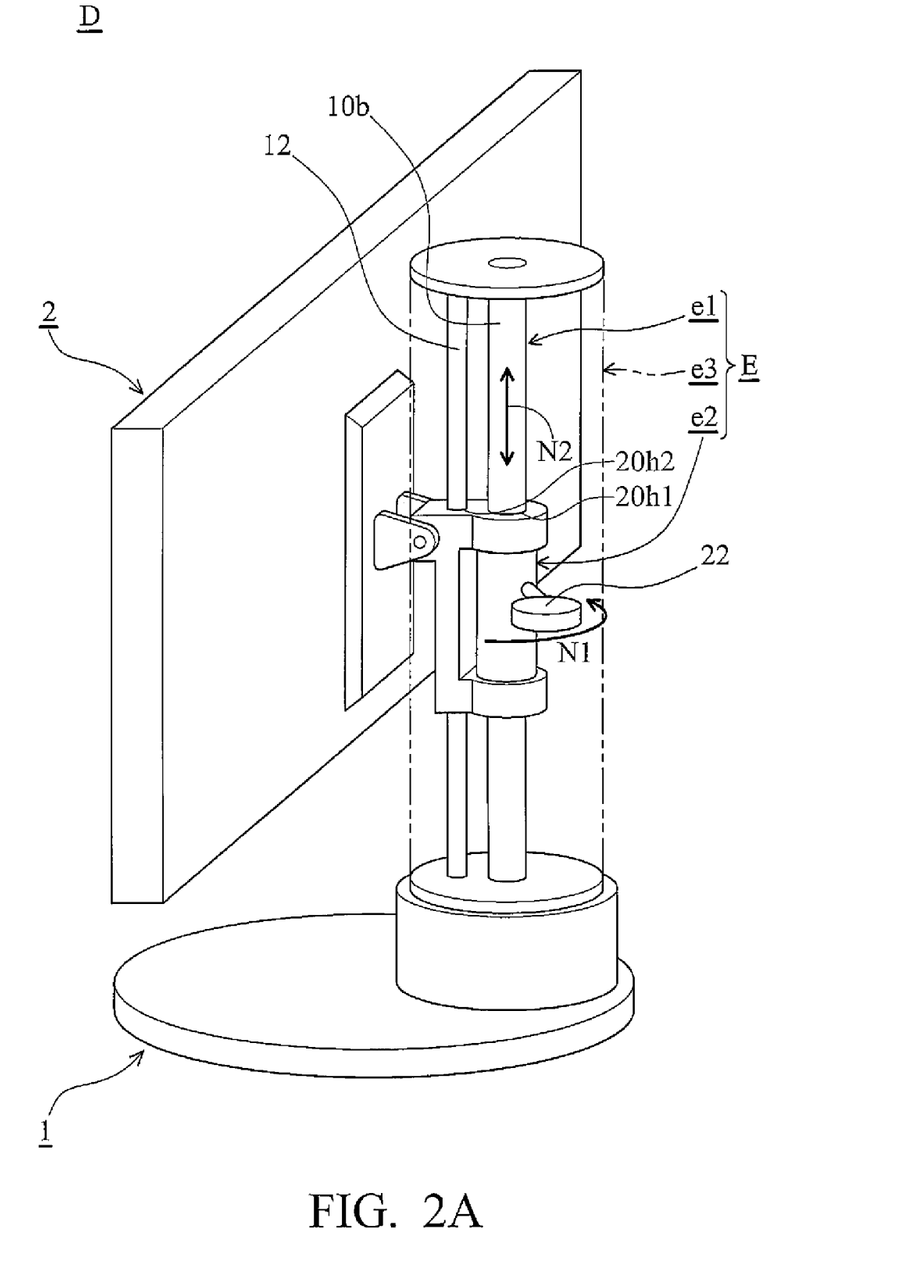
FIG. 2A is a schematic view of a display of the invention.
Figure 2B:
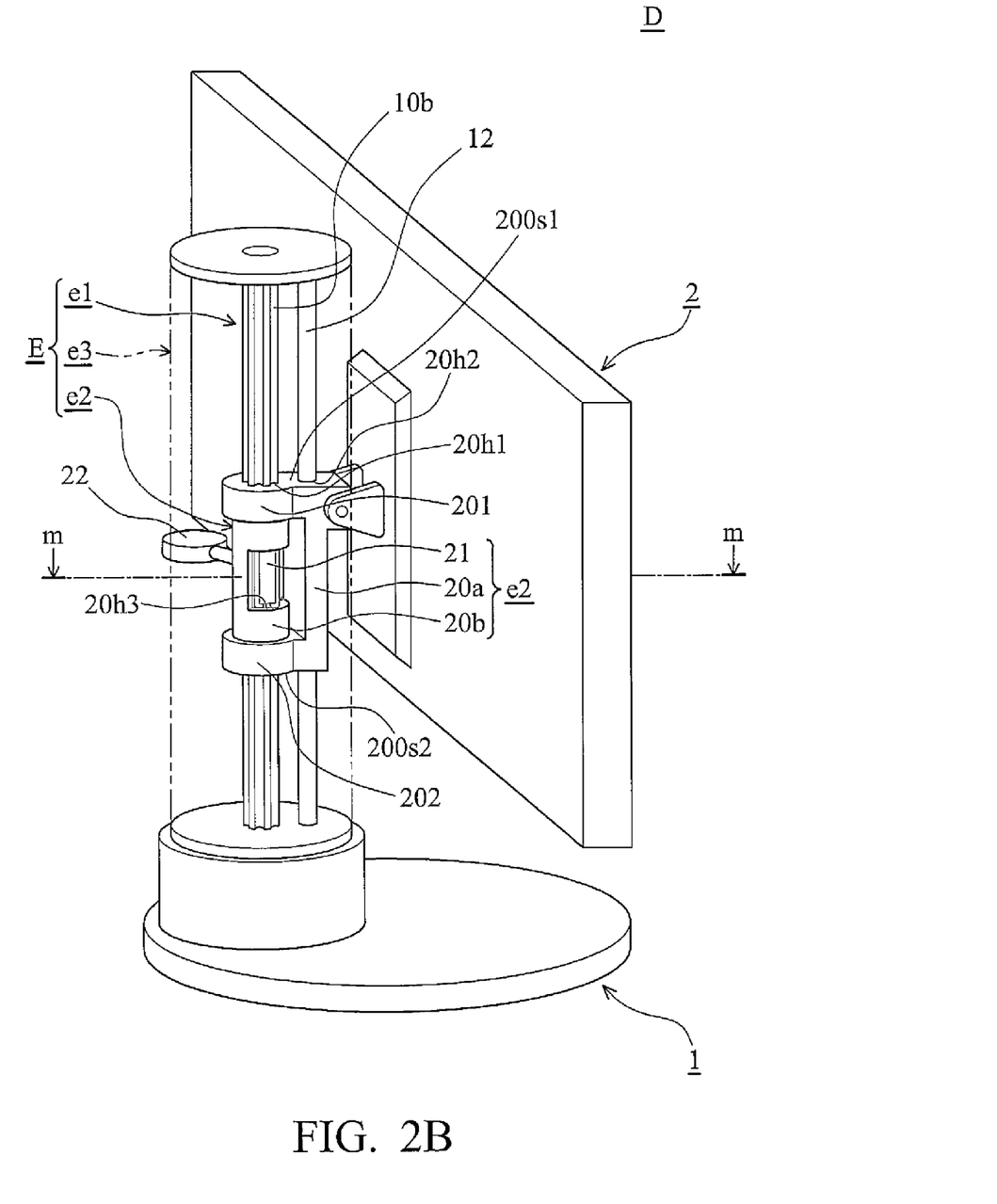
FIG. 2B is a schematic view of a display of the invention.

In FIGS. 2A and 2B, the regulating device E comprises a first element e1, a second element e2 and a third element e3. The first element e1 is a substantially polar structure. The second element e2, connected to the panel 2 and disposed on the first element e1 to be movably switched between a first position (FIG. 1A) and a second position (FIG. 1B), comprises a second positioning region 21 detachably disposed in the first element e1. The second element e2 is moved in a first direction N1-N1' and a second direction N2-N2' along the first element e1, thus, the position of panel 2 is regulated. The third element e3 guide the second element e2 and positions the second element e2 to a desired position.

Figure 3:
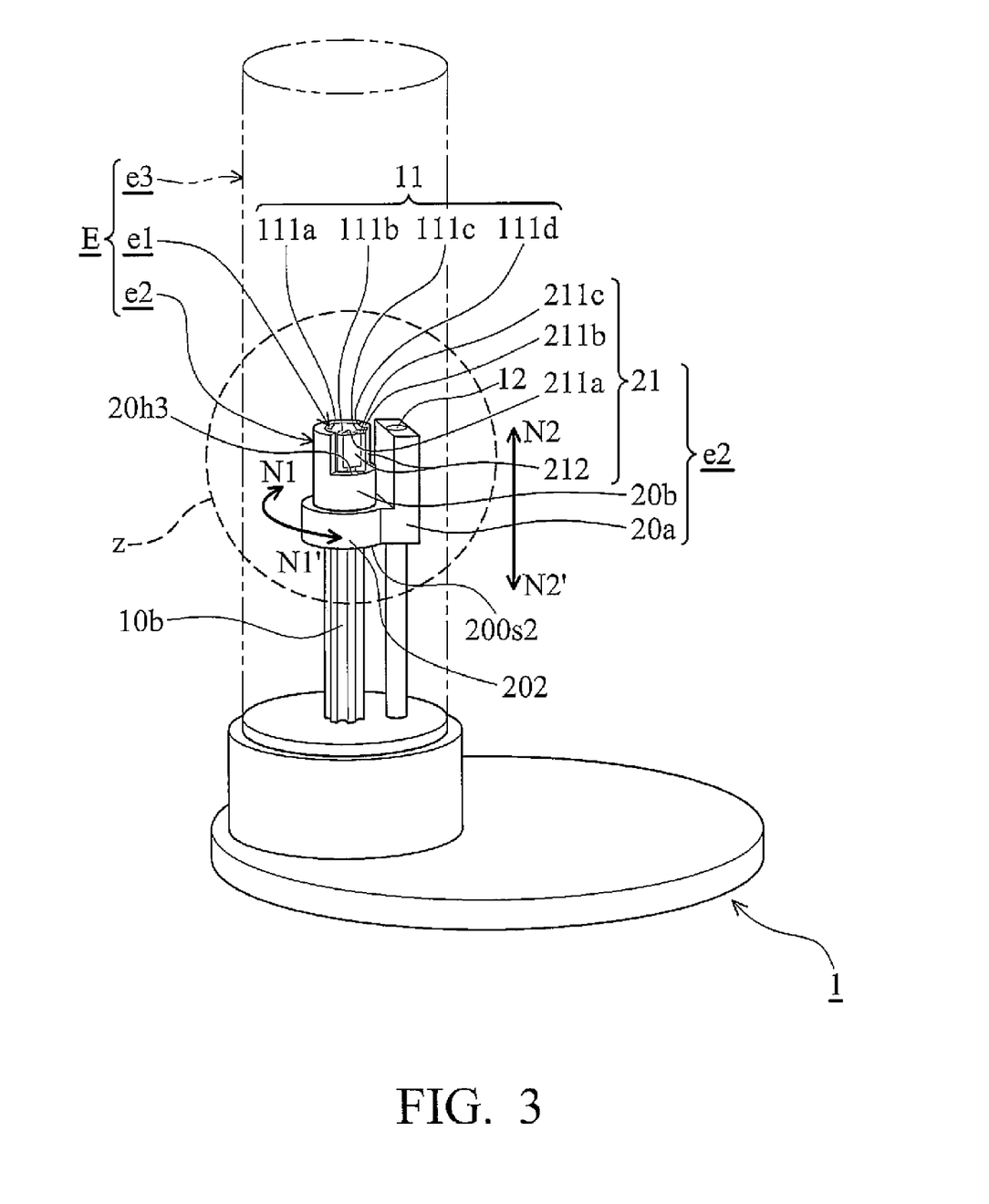
FIG. 3 is a partially sectional view of the display from line (m-m) of FIG. 2B.
Figure 4:
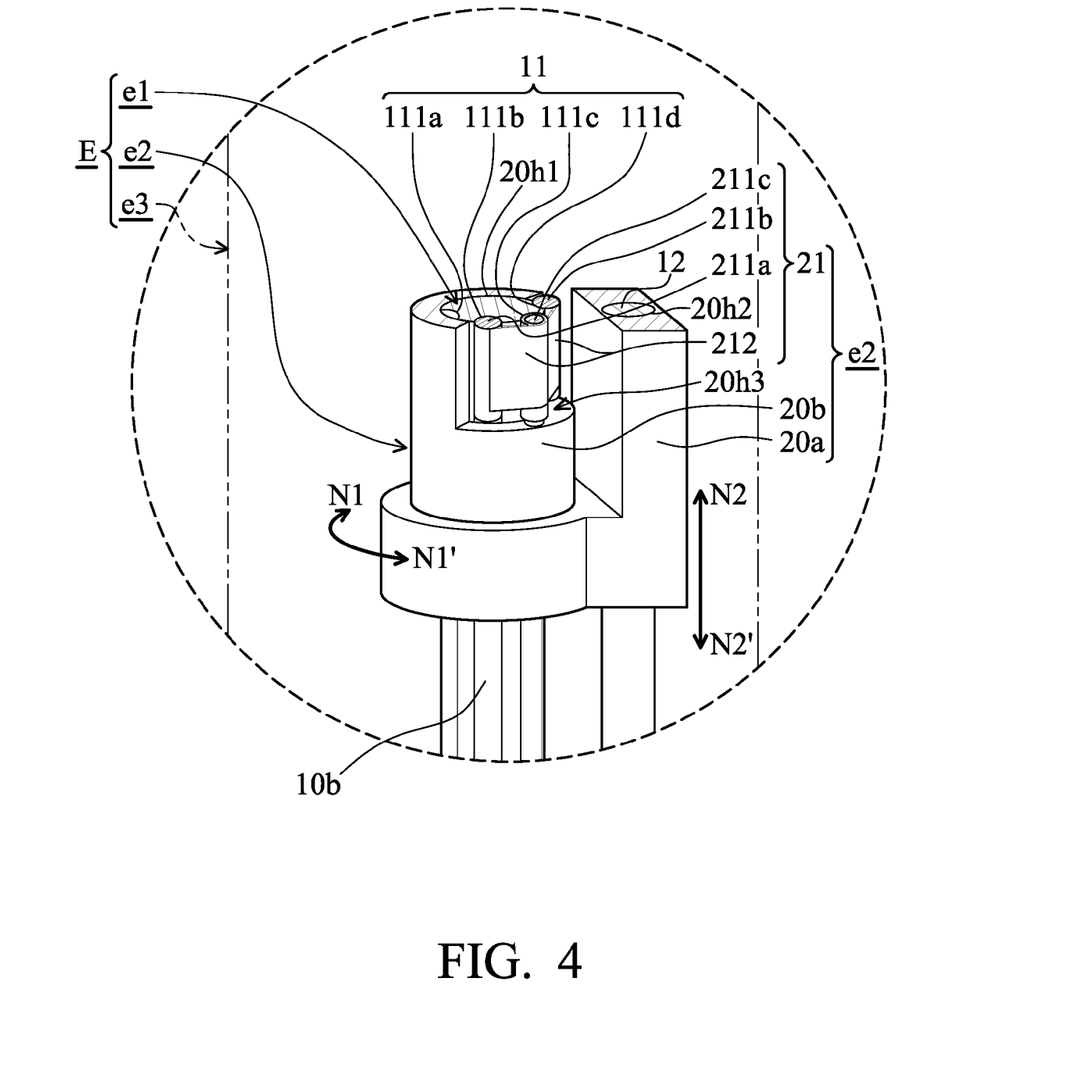
FIG. 4 is an enlarged view of the structure from a region (z) of FIG. 3.

In FIGS. 3 and 4, the first element e1 comprises a first body 10*b* extending from the base 1, a first positioning region 11, and a guide bar 12 extending from the base 1 parallel to and spaced apart from the first body 10*b*. The first body 10*b* is a cylindrical structure. The first positioning region 11 comprises a plurality of recesses 111*a*, 111*b*, 111*c* and 111*d*, spaced apart and disposed in parallel at the periphery of and in the longitudinal direction of the first body 10*b*.

In FIG. 2B, the second element e2 comprises a second body 20*a*, a cylindrical sleeve 20*b*, a second positioning region 21 and a handle 22.

The second body 20*a* is a U-shaped structure coupled to a side of the panel 2. The panel 2 comprises two ends 200*s*1/200*s*2, two extending portions 201/202, a first axial hole 20*h*1 and a second axial hole 20*h*2. The first and second axial holes 20*h*1 and 20*h*2 penetrate through the ends 200*s*1/200*s*2, and the first body 10*b* of the first element e1 and the guiding bar 12 are respectively received in the first and second axial holes 20*h*1 and 20*h*2. The second body 20*a* can only be moved by the guiding bar 12 along the second direction N2-N2' upwardly and downwardly. The sleeve 20*b*, disposed on the extending portions 201 and 202 of the second body 20*a*, comprises a rectangular opening 20h3 at the periphery thereof. The handle 22 is connected to the outer surface of the sleeve 20b.

Figure 6A:
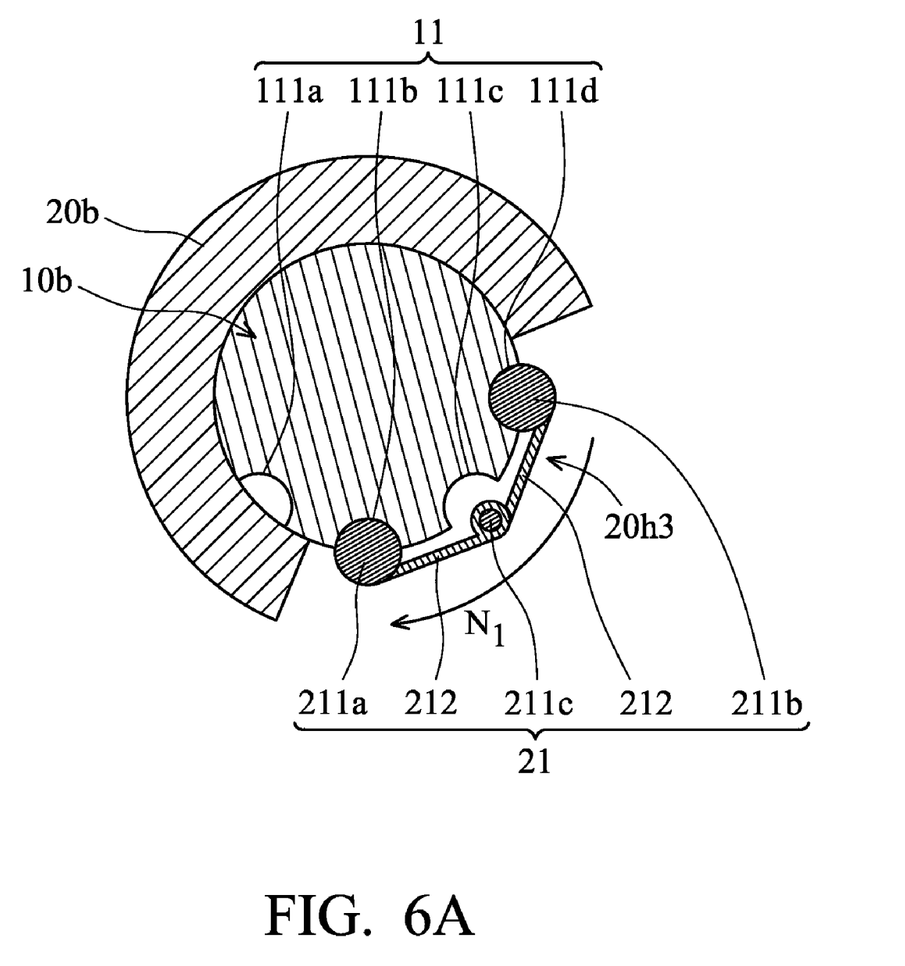
FIGS. 6A-6C are a partial sectional views of first and second elements of the invention.

Referring to FIGS. 4 and 6A, the second positioning region 21, detachably disposed on the first positioning region 11 of the first element e1 comprises a plurality of cylindrical positioning parts 211a, 211b and 211c and two connecting parts 212. The positioning part 211c is attached to the edge of the opening 20h3. The connecting parts 212 are respectively connected to the region between the positioning parts 211a and 211c and the region between the positioning parts 211b and 211c. The positioning parts 211a, 211b and 211c and the connecting parts 212 form a V-shaped structure inwardly faced toward the first body 10b of the first element e1.

The positioning parts 211a and 211b of the second positioning region 21 are respectively positioned in the recesses 111b and 111d of the first positioning region 11 of the first element e1, i.e., the recesses 111b and 111d of the first positioning region 11 of the first element e1 are used to position the second positioning region 21 of the second element e2.

Figure 6B:
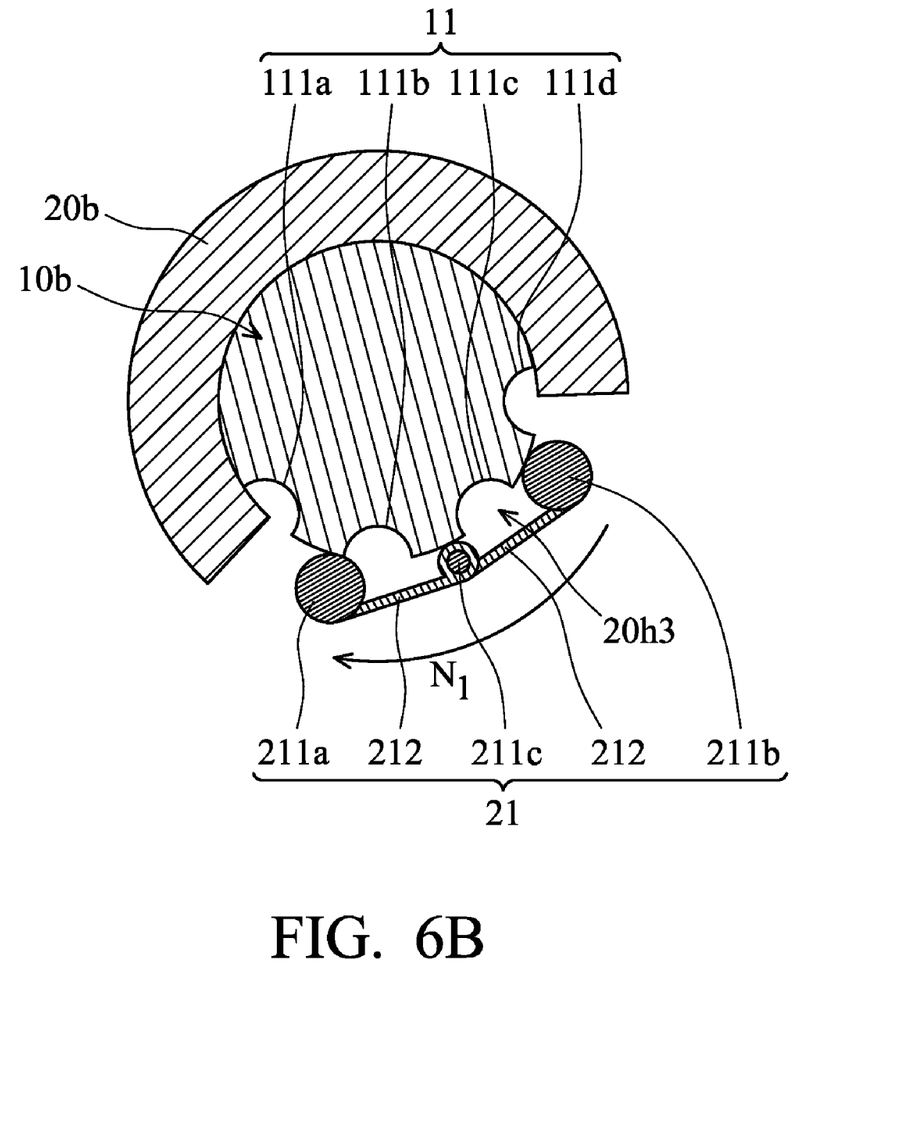
Figure 6C:
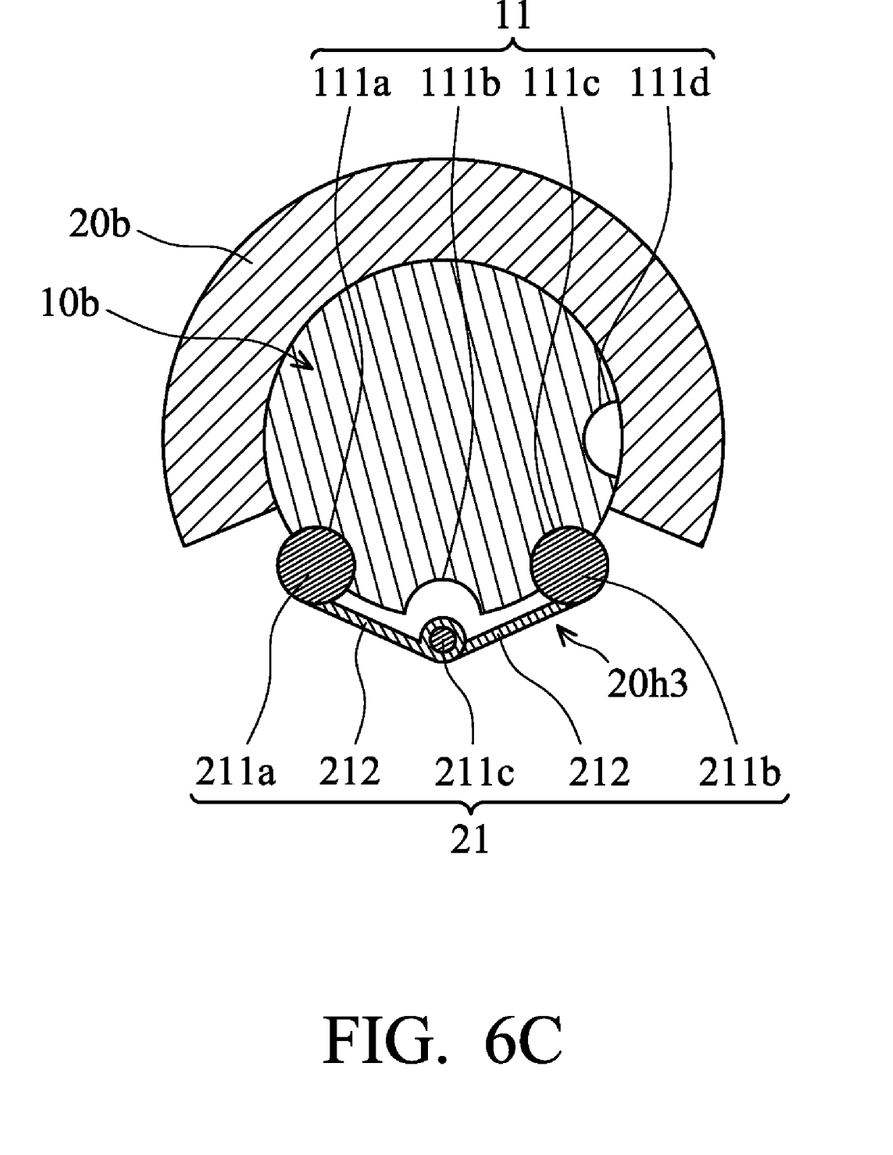

Referring to FIGS. 6B and 6C, when the sleeve 20b is moved along the direction N1 by the handle 22, the positioning parts 211a and 211b of the second positioning region 21, disengaged from the recesses 111b and 111d of the first positioning region 11 of the first element e1 (FIG. 6B), are respectively engaged by the recesses 111a and 111c of the first positioning region 11 of the first element e1, thus, the sleeve 20b of the second element e2 is positioned in the recesses 111a and 111c of the first positioning region 11 (FIG. 6C). In this embodiment, the connecting parts 212 are reeds.

Referring again to FIGS. 1A and 1B, the third element e3 disposed outside of the first and second elements e1 and e2 is a hollow cylindrical member, comprising a third positioning region 31 used to position the second element e2. The third positioning region 31 of the third element e3 is a slotted structure, comprising a middle channel 310, a plurality of first sub-channels 311 connected to the middle channel 310 and a plurality of second sub-channels 312 connected to the middle channel 310. The spaced first sub-channels 311 and the spaced second sub-channels 312 are located in both sides of the middle channel 310, respectively.

When the third element e3 is disposed outside the first and second elements e1 and e2, the handle 22 of the second element e2 passing through the middle channel 310, the first sub-channels 311 or the second sub-channels 312 protrudes from the outside of the third element e3. Positions r1 and r2 represent the handle 22 of the second element e2 located at two different heights, respectively. A distance Δr is a height difference between the positions r1 and r2.

As shown in FIG. 1A or 1B, when the handle 22 of the second element e2 located in position r1 is positioned in the second sub-channels 312 of the third positioning region 31. The positioning parts 211a and 211b of the second positioning region 21 carried by the sleeve 20b of the second element e2 are simultaneously positioned in the recesses 111b and 111d of the first positioning region 11 of the first element e1 (shown in FIG. 4.), thus, ensuring that the panel 2 relatively is positioned in the position r1 or r2.

Figure 5:
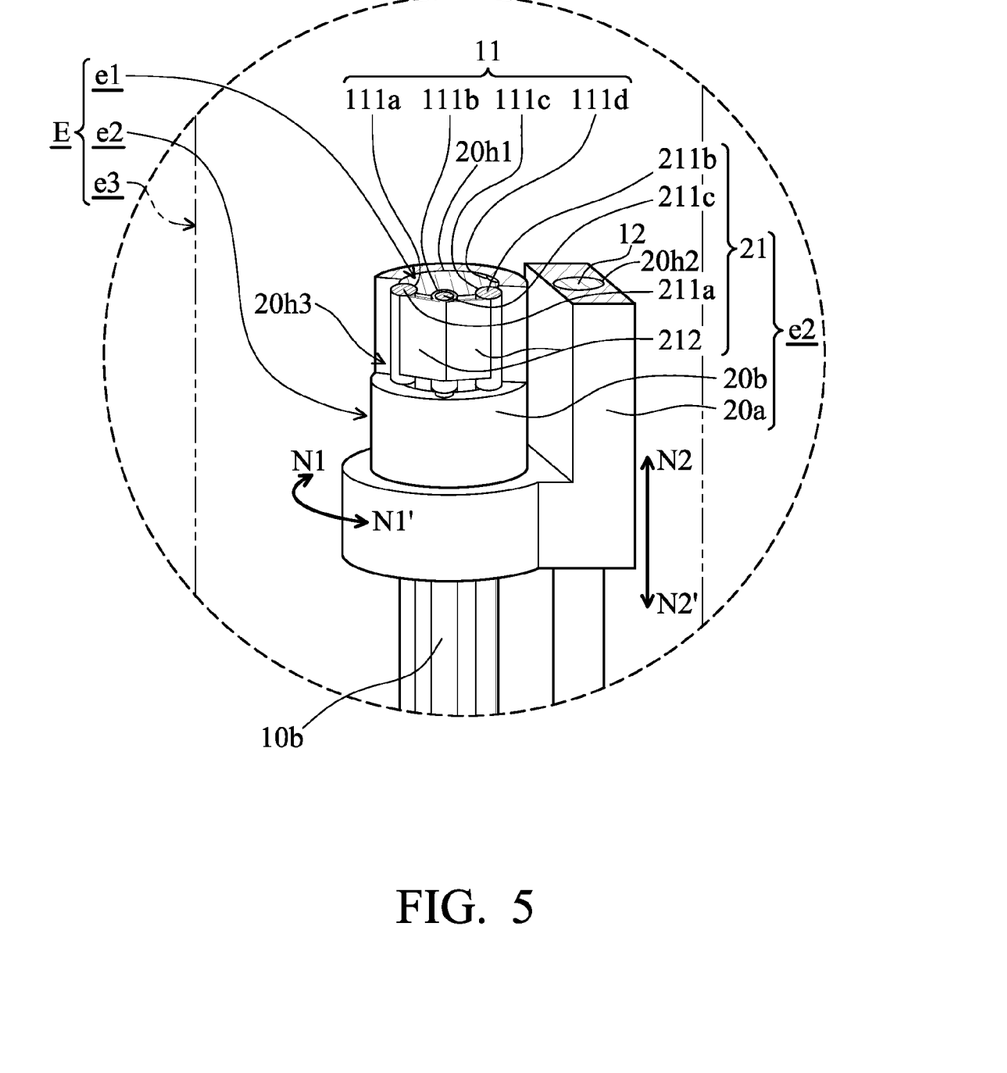
FIG. 5 is a perspective view of the structure of FIG. 4.

As shown in FIG. 1A or 1B, when the handle 22 of the second element e2 moved to the position r3 (shown in FIG. 1C) is positioned in the first sub-channels 311 of the third positioning region 31. The positioning parts 211a and 211b of the second positioning region 21 are simultaneously positioned in the recesses 111a and 111c of the first positioning region 11 of the first element e1 (shown in FIG. 5).

Thus, the panel 2 is capable of switching to a desired height with respect to the base 1 by the regulating device E.

While the invention has been described by way of example and in terms of the preferred embodiments, it is to be understood thin the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A regulating device, comprising:
   a first element comprising a first body, a guide bar, and a first positioning region, wherein the first body is a cylindrical structure extending along a longitudinal direction, and the guide bar is parallel with the first body, and the first positioning region is disposed at the first body;
   a second element comprising a second body having a first axial hole and a second axial hole, a cylindrical sleeve disposed between two extending portions of the second body, a second positioning region connected to the sleeve, and a handle connected to an outer surface of the sleeve, wherein the first body is received in the first axial hole and the sleeve, and the guide bar is received in the second axial hole, wherein when the sleeve is rotated about the longitudinal direction by the handle, the second positioning region is detachably disposed in the first positioning region of the first element, and the second element moves between a first position and a second position along the guide bar; and
   a third element disposed outside of a portion of the first and second elements and comprising a third positioning region used to position the second element, wherein the third positioning region is a slotted structure comprising a middle channel and a plurality of spaced sub-channels connected to the middle channel and located in both sides of the middle channel, wherein the handle is guided by the slotted structure, and the handle is optionally positioned in the sub-channels,
   wherein the second positioning region of the second element is positioned in the first positioning region of the first element when the second element is positioned in the first position, and the second positioning region of the second element is positioned in the first positioning region of the first element when the second element is moved to the second position from the first position, wherein a distance is formed between the first position and the second position.

2. The regulating device as claimed in claim 1, wherein the distance is a height difference.

3. The regulating device as claimed in claim 1, wherein the third element is a hollow cylindrical member.

4. The regulating device as claimed in claim 1, wherein the first positioning region of the first element comprises at least two recesses used to position the second positioning region of the second element.

5. The regulating device as claimed in claim 1, wherein the second positioning region of the second element comprises a first positioning part, a second positioning part, and a resilient connecting part connected between the first positioning part and a second positioning part.

6. The regulating device as claimed in claim 5, wherein the first positioning region comprises a first recess and a second recess, wherein the first positioning part and the second positioning part are respectively positioned in the first recess and the second recess, and when the sleeve is moved along a first direction by the handle, the first positioning part and the second positioning part are disengaged from the first recess and the second recess.

7. A display, comprising:
- a base;
- a panel; and
- a regulating device disposed between the base and the panel, comprising;
    - a first element comprising a first body, a guide bar, and a first positioning region, wherein the first body is a cylindrical structure extending along a longitudinal direction, and the guide bar is parallel with the first body and extended from the base, and the first positioning region is disposed at the first body;
    - a second element comprising a second body having a first axial hole and a second axial hole, a cylindrical sleeve disposed between two extending portions of the second body, a second positioning region connected to the sleeve, and a handle connected to an outer surface of the sleeve, wherein the first body is received in the first axial hole and the sleeve, and the guide bar is received in the second axial hole, wherein when the sleeve is rotated about the longitudinal direction by the handle, the second positioning region is detachably disposed in the first positioning region of the first element, and the second element moves between a first position and a second position along the guide bar; and
    - a third element disposed outside of a portion of the first and second elements and comprising a third positioning region used to position the second element, wherein the third positioning region is a slotted structure comprising a middle channel and a plurality of spaced sub-channels connected to the middle channel and located in both sides of the middle channel, wherein the handle is guided by the slotted structure, and the handle is optionally positioned in the sub-channels, wherein the second positioning region of the second element is positioned in the first positioning region of the first element when the second element is positioned in the first position, and the second positioning region of the second element is positioned in the first positioning region of the first element when the second element is moved to the second position from the first position, wherein a distance is formed between the first position and the second position.

8. The display as claimed in claim 7, wherein the distance is a height difference.

9. The display as claimed in claim 7, wherein the third element is a hollow cylindrical member.

10. The display as claimed in claim 7, wherein the first positioning region of the first element comprises at least two recesses used to position the second positioning region of the second element.

11. The display as claimed in claim 7, wherein the second positioning region of the second element comprises a first positioning part, a second positioning part, and a resilient connecting part connected between the first positioning part and a second positioning part.

12. The display as claimed in claim 11, wherein the first positioning region comprises a first recess and a second recess, wherein the first positioning part and the second positioning part are respectively positioned in the first recess and the second recess, and when the sleeve is moved along a first direction by the handle, the first positioning part and the second positioning part are disengaged from the first recess and the second recess.

* * * * *